United States Patent [19]
Winkler et al.

[11] 3,728,013
[45] Apr. 17, 1973

[54] AUXILIARY DRIVE FOR COMPONENTS OF PHOTOGRAPHIC APPARATUS

[75] Inventors: Friedrich Winkler; Johann Zanner, Jr., Unterhaching, Germany

[73] Assignee: Agfa-Gevaert Aktiengesellschaft, Leverkusen, Germany

[22] Filed: Sept. 18, 1970

[21] Appl. No.: 73,353

[30] Foreign Application Priority Data

Sept. 20, 1969 Germany.................P 19 47 756.6

[52] U.S. Cl..............................352/166, 352/91
[51] Int. Cl............................................G03b 1/00
[58] Field of Search.......................352/91, 121, 166

[56] References Cited

UNITED STATES PATENTS

| | | | |
|---|---|---|---|
| 3,494,691 | 2/1970 | Katsuyama | 352/91 |
| 3,606,529 | 9/1971 | Reinsch et al. | 352/91 |
| 3,617,118 | 11/1971 | Muller | 352/91 |
| 3,644,025 | 2/1972 | Katsuyama | 352/91 |
| 3,545,852 | 12/1970 | Winkler et al. | 352/91 |
| 3,246,944 | 4/1966 | Winkler | 352/91 |
| 3,582,198 | 6/1971 | Reinsch | 352/91 |
| 3,549,249 | 12/1970 | Katsuyama | 352/91 X |

*Primary Examiner*—John M. Horan
*Assistant Examiner*—Russel E. Adams, Jr.
*Attorney*—Michael S. Striker

[57] ABSTRACT

A programming device for the fading means in a motion picture camera can be indexed by the camera motor through the intermediary of an auxiliary drive which can be activated and deactivated at the will of the user. The auxiliary drive receives motion from a worm shaft which is constantly driven by the camera motor, and the auxiliary drive has a single worm gear or a cluster of coaxial worm gears movable into and out of mesh with the worm shaft in response to rotation of a knob, and a power train which indexes the programming device when the motor is on and the worm shaft meshes with the single worm gear or with a selected worm gear of the cluster. The programming device is a ratchet wheel and the power train has a pawl which is biased against the teeth of the ratchet wheel and a crankshaft which rocks a lever serving to transmit motion to the pawl.

9 Claims, 4 Drawing Figures

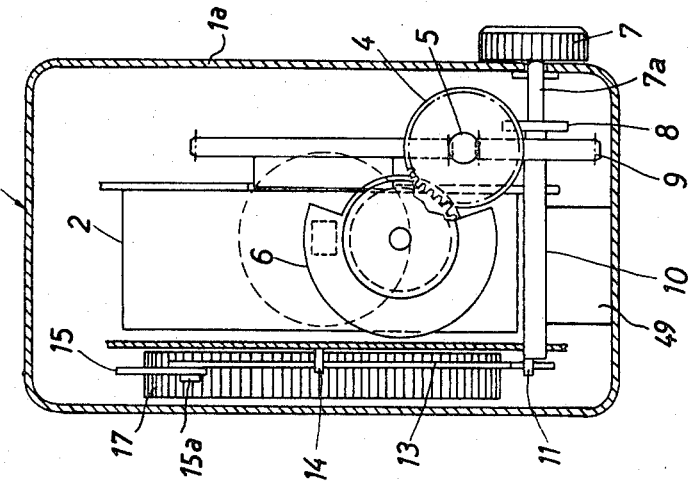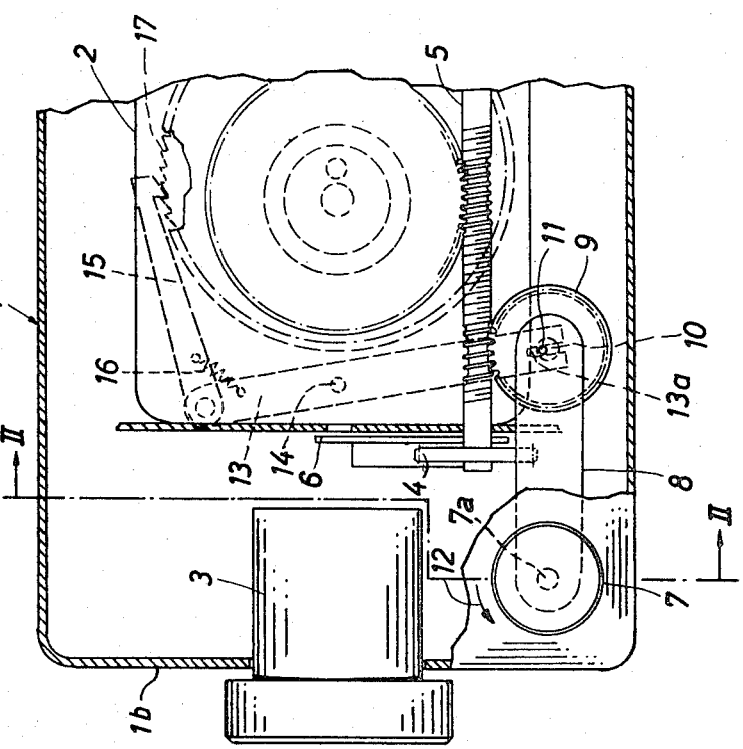

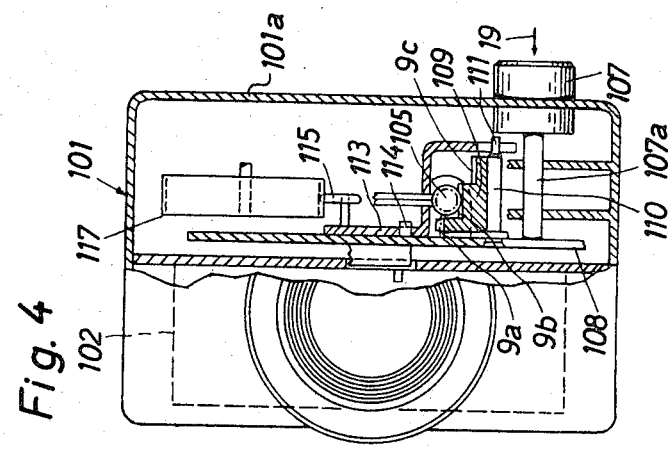
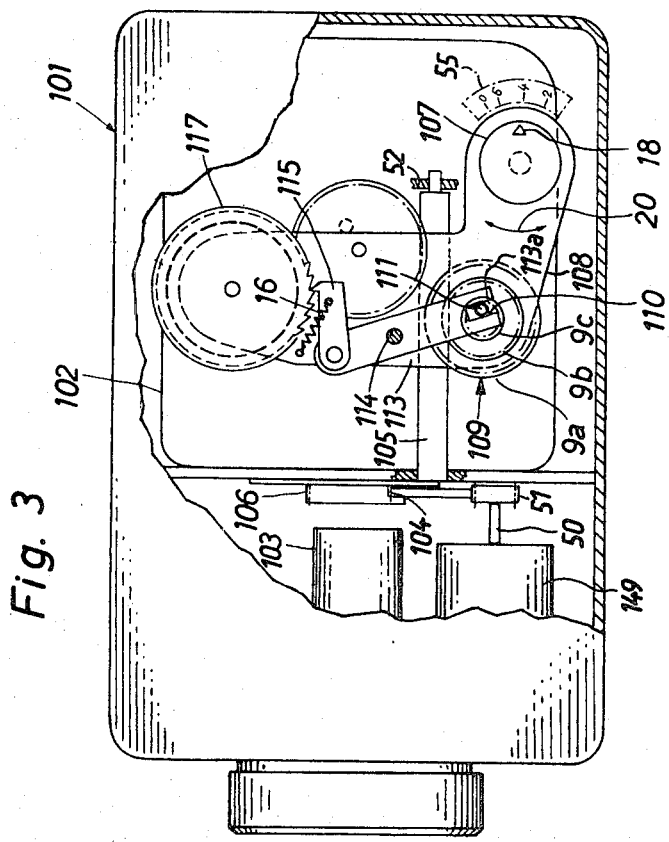

AUXILIARY DRIVE FOR COMPONENTS OF PHOTOGRAPHIC APPARATUS

BACKGROUND OF THE INVENTION

The present invention relates to photographic apparatus in general, and more particularly to improvements in motion picture cameras or still cameras having a prime mover which includes a spring motor, an electric motor or another type of motor. Such motors are used in motion picture cameras to drive the shutter, to operate the claw pull-down of the film transporting mechanism, to change the focal length of the picture taking lens, to operate the fading means which can make exposures with fade-out and fade-in effect, to make other types of trick shots, to make individual exposures and/or to make successive exposures at a desired frequency. In a still camera, the motor can be used to drive the film transporting mechanism, to cock the shutter, to actuate the camera release, and/or to perform certain other functions.

SUMMARY OF THE INVENTION

An object of the invention is to provide a photographic apparatus whose prime mover comprises a motor with a novel and improved auxiliary drive which can be used to operate one or more auxiliary or optional camera assemblies, for example, to operate the fading means in a motion picture camera.

Another object of the invention is to provide an auxiliary drive which can be rapidly, conveniently and repeatedly coupled to and uncoupled from the motor of the prime mover to operate the associated auxiliary assembly for selected intervals of time.

A further object of the invention is to provide an auxiliary drive which occupies little room and comprises a relatively small number of simple and rugged parts so that it can be used with particular advantage in compact photographic apparatus such as motion picture cameras for 8-millimeter film or portable still cameras.

The invention is embodied in a photographic apparatus which comprises a housing, a prime mover mounted in the housing and including preferably an electric motor and a rotary output member (preferably a worm shaft) which is driven by the motor, for example, by way of a set of spur gears, a first camera assembly (such as a shutter, a film transporting mechanism or a mechanism for changing the focal length of the picture taking lens) which is driven by the motor of the prime mover, either continuously or intermitantly, an auxiliary or optional camera assembly (for example, a fading means which can make exposures with fade-out and fade-in effect), and an auxiliary drive for the auxiliary assembly.

The auxiliary drive comprises a rotary input member (preferably a worm gear or a cluster of two or more coaxial worm gears having different diameters) which is movable into and from torque-receiving engagement with the output member of the prime mover, a power train which connects the input member with the auxiliary camera assembly, and actuating means for moving the input member into and out of engagement with the output member at the will of the operator.

The novel features which are considered as characteristic of the invention are set forth in particular in the appended claims. The improved photographic apparatus itself, however, both as to its construction and its mode of operation, together with additional features and advantages thereof, will best be understood upon perusal of the following detailed description of certain specific embodiments with reference to the accompanying drawing.

BRIEF DESCRIPTION OF THE DRAWING

FIG. 1 is a fragmentary longitudinal vertical sectional view of a motion picutre camera including an auxiliary drive which embodies one form of the invention;

FIG. 2 is a sectional view as seen in the direction of arrows from the line II—II of FIG. 1;

FIG. 3 is a partly side elevational and partly sectional view of a motion picture camera whose auxiliary drive is constructed in accordance with a second embodiment of the invention; and FIG. 4 is a partly front elevational and partly transverse vertical sectional view of the camera shown in FIG. 3.

DESCRIPTION OF THE PREFERRED EMBODIMENTS

FIGS. 1 and 2 illustrate certain parts of a motion picture camera for 8-millimeter film. The camera comprises a housing or body 1 which has a chamber for a removable magazine or cassette 2 containing motion picture film. The mount 3 for the picture taking lens is installed in the front wall 1B of the housing 1. The prime mover of the camera comprises an electric motor 49 which is mounted in the housing 1, a spur gear 4 which is driven by the motor 49, and a rotary output member 5, here shown as a worm shaft, which is driven by the gear 4. The just described prime mover serves to impart motion to one or more camera assemblies, for example, to a rotary shutter 6 which is driven by the spur gear 4, the claw pull-down (not shown) of a customary film transporting mechanism, and/or a mechanism for changing the focal length of the picture taking lens.

In addition, the prime mover including the motor 49, gear 4 and worm shaft 5 serves to drive at least one auxiliary camera assembly, for example, a fading means which can be used to make trick shots including fade-out and fade-in effects or a device for making individual exposures or a succession of exposures at less than average number of frames per minute. In the embodiment of FIGS. 1 and 2, the auxiliary camera assembly includes a fading means having an indexible programming device here shown as a ratchet wheel 17. The auxiliary drive for the ratchet wheel 17 derives motion from the prime mover and serves to index the ratchet wheel during the making of exposures with fade-out and fade-in effect.

The auxiliary drive for the ratchet wheel 17 comprises a rotary input member 9, here shown as a worm gear, which is pivotable about the axis of a shaft or stem 7a to move into or out of mesh with the worm shaft 5, i.e., with the output member of the prime mover. The auxiliary drive further comprises actuating means which is operated at the will of the user of the camera and serves to move the worm gear 9 into or out of mesh with the worm shaft 5, and a power train which connects the worm gear 9 with the ratchet wheel 17. The actuating means includes the aforementioned shaft 7a which is journalled in a side wall 1a of the housing 1, a handgrip member or knob 7 which is fixed to the shaft 7a adjacent to the outer side of the wall 1a of the housing 1, and a lever 8 which is fixedly connected to and is pivotable by the shaft 7a. The worm gear 9 is rotatable with a crank shaft 10 which is journalled in the lever 8. The crankshaft 10 is parallel to the shaft 7a and is normal to and crosses in space with the worm shaft 5. The arrow 12 indicates the direction in which the knob 7 must be rotated in order to move the worm gear 9 into mesh with the worm shaft 5.

The power train between the worm gear 9 and the ratchet wheel 17 comprises the crankshaft 10 which is driven by the worm gear 9, an eccentric pin 11 at that axial end of the crankshaft 10 which is remote from the worm gear 9, a two-armed lever 13 which is fulcrumed on a pivot pin 14 provided in the housing 1, a pawl 15 which is pivotally connected with one arm of the lever 13, as at 15a, and a helical spring 16 which operates between the one arm of the lever 13 and the pawl 15 and tends to turn the pawl in a clockwise direction, as viewed in FIG. 1. The ratchet wheel 17 is rotatably mounted in the housing 1 and can perform a series of functions, such as gradually closing the diaphragm during fade-out, gradually opening the diaphragm during fade-in, and/or others. The spring 16 biases the pallet of the pawl 15 against the teeth of the ratchet wheel 17. The other arm of the lever 13 has an elongated slot 13a which receives the eccentric pin 11 of the crankshaft 10. The connection between the crankshaft 10 and lever 13 is such that the crankshaft does not interfere with movements of the worm gear 9 into and out of mesh with the worm shaft 5.

The parts 15, 16 of the auxiliary drive can rotate the ratchet wheel 17 at a speed which is considerably less than the speed of the output shaft of the motor 49. As stated before, the ratchet wheel 17 can open or close the diaphragm during fade-in and fade-out, cause rearward transport of film in the cassette 2, and/or operate a device for the making of individual exposures. The exact manner in which the ratchet wheel 17 performs such function or functions forms no part of the present invention. For example, the ratchet wheel 17 can perform the function of the member 10 in the drawing of U.S. Pat. No. 3,617,118, issued Nov. 2, 1971 to Hermann Muller and assigned to the same assignee.

FIGS. 3 and 4 illustrate a modified motion picture camera. All such parts which are clearly identical with or analagous to the parts of the camera shown in FIGS. 1 and 2 are denoted by similar reference characters plus 100. The motor 149 of the prime mover is mounted in the housing 101 below the lens mount 103. The output shaft 50 of this motor drives the spur gear 104 by way of a pinion 51. The gear 104 drives the shutter 106 and the output member or worm shaft 105 which is mounted in bearings 52.

The auxiliary drive serves to index a programming device here shown as a ratchet wheel 117. The ratchet wheel 117 receives motion from a power train which is driven by a modified input member 109 of the auxiliary drive. The input member 109 is a cluster of three worm gears 9a, 9b, 9c having different diameters. This enables the auxiliary drive to rotate the ratchet wheel 117 at three speeds which is particularly desirable when the user of the camera wishes to make trick shots or for certain other purposes.

The actuating means of the auxiliary drive comprises a handgrip member or knob 107 which is rotatably and axially movably mounted in a side wall of the housing 101, or stem 107a which is coaxial with and rigidly secured to the knob 107 and is guided in bearings provided therefor in the housing 101 so that it can move axially as well as angularly, and a lever 108 which is fixed to the shaft 107a. The cluster 109 is mounted on the crankshaft 110 which is rotatably journalled in the lever 108 and has an eccentric pin 111 extending into an elongated slot 113a in the lower arm of a two-armed lever 113 whose pivot pin 114 is fixed to the lever 108. The upper arm of the lever 113 is pivotally connected with a pawl 115 which is biased by a helical spring 116 so that it tends to turn in a counterclockwise direction, as viewed in FIG. 3, and to maintain its pallet in engagement with the teeth of the ratchet wheel 117. It will be noted that the spring 116 is mounted on the lever 108. The lever 108 is a bell crank lever which is fulcrumed at 107a so that it can pivot in response to rotation of the knob 107. The junction of the two arms of the lever 108 supports the cluster 109 and the upper arm of the lever 108 supports the spring 116 and the pivot pin 114 for the lever 113. The axial length of the ratchet wheel 117 is such that it remains in engagement with the pawl 115 in each axial position of the knob 107, i.e., regardless of whether the worm shaft 105 registers with the worm gear 9a, 9b, or 9c.

The camera of FIGS. 3 and 4 is further provided with indicating means which enables the operator to rapidly select that worm gear of the cluster 109 which is to be moved into register with the worm shaft 105. Such indicating means comprises an index 18 on the knob 107 and a scale or dial 55 provided on the side wall 101a of the housing 101. The arrow 19 indicates the direction in which the knob 107 is to be moved in order to move the worm gear 9c into register with the worm shaft 105. The arrow 20 indicates the directions in which the knob 107 is to be rotated in order to move the worm gear 9a, 9b or 9c into or out of mesh with the worm shaft 105.

FIGS. 3 and 4 show the knob 107 in an axial position in which the median worm gear 9b registers with the worm shaft 105. The knob 107 is held in an angular position in which its index 18 registers with the graduation "4" on the scale 55 of the side wall 101a. This indicates that the median worm gear 9b is in mesh with the worm shaft 105 and that the ratchet wheel 117 will be rotated at a speed indicated by the graduation "4" as soon as the circuit of the motor 149 is completed. The spring 116 biases the pallet of the pawl 115 against the adjacent teeth of the ratchet wheel 117. When the motor 149 is on, the pawl 115 rotates the ratchet wheel 117 incrementally while moving in one direction but its pallet merely rides over one or more teeth of the ratchet wheel when the pawl moves in the opposite direction.

If the user of the camera wishes to change the speed of the ratchet wheel 117, the knob 107 is first rotated in a direction to move the index 18 into register with the graduation "0" on the scale 55. This causes the shaft 107a and the lever 108 to pivot in a direction to disengage the median worm gear 9b from the worm shaft 105. If the user then wishes to drive the ratchet wheel 117 at the speed indicated by the graduated "2" on the scale 55, the knob 107 is moved axially, as indicated by the arrow 19, so as to place the worm gear 9c into register with the worm shaft 105. The peripheral surface of the knob 107 may be provided with symbols (not shown) to facilitate rapid selection of the desired axial position of the cluster 109. The user then turns the knob 107 so as to move the index 18 into alignment with the graduation "2" of the scale 55. The auxiliary drive is then ready to rotate the ratchet wheel 117 at the selected speed as soon as the circuit of the motor 149 is completed.

The manipulation of the auxiliary drive in order to rotate the ratchet wheel 117 at the speed which is indicated by the graduation "6" on the scale 55 of the side wall 101a involves moving the knob 107 (arrow 19) to an angular position in which the index 18 registers with the graduation "0", thereupon moving the knob 107 in the opposite axial direction to align the worm gear 9a with the worm shaft 105, and rotating the knob 107 until the index 18 reaches the graduation "6".

The improved motion picture camera is susceptible of many additional modifications. For example, the auxiliary drive can be used with equal advantage in certain types of still cameras, namely, in those still cameras wherein a motor is used to cock the shutter, to transport the film stepwise and/or to perform one or more additional functions. The auxiliary drive can be used in still cameras to effect the making of two or more exposures at desired intervals, to change the focal length of the picture taking lens and/or for other purposes. In a still camera, the ratchet wheel 17 or 117 can be used to alternately operate the film transporting mechanism and the shutter cocking means on the one hand, and the camera release on the other hand.

Without further analysis, the foregoing will so fully reveal the gist of the present invention that others can, by applying current knowledge, readily adapt it for various applications without omitting features which fairly constitute essential characteristics of the generic and specific aspects of our contribution to the art and, therefore, such adaptations should and are intended to be comprehended within the meaning and range of equivalence of the claims.

What is claimed as new and desired to be protected by Letters Patent is set forth in the appended.

1. In a photographic apparatus, a combination comprising a housing; a prime mover mounted in said housing and including a motor and a rotary output member driven by said motor; a first camera assembly for receiving motion from said prime mover; an auxiliary camera assembly; and an auxiliary drive for said auxiliary camera assembly, comprising a rotary input member movable into and from direct torque-receiving engagement with said output member, a power train connecting said input member with said auxiliary camera assembly and including a crankshaft driven by said input member and a pawl driven back and forth by said crankshaft, said auxiliary camera assembly comprising a ratchet wheel intermittently driven by said pawl and said auxiliary drive further comprising actuating means for moving said input member into and from direct engagement with said output member at the will of the operator.

2. A combination as defined in claim 1, wherein said output member is a worm shaft and said input member is a worm gear.

3. A combination as defined in claim 1, wherein said actuating means comprises a lever fulcrumed in said housing for pivotal movement about a predetermined axis and a handgrip member for pivoting said lever, said input member being mounted on said lever for rotation about a second axis.

4. A combination as defined in claim 1, wherein said power train further comprises a lever mounted in said housing for pivotal movement about a predetermined axis, said lever having a first arm which is pivoted by said crankshaft and a second arm which moves said pawl.

5. In a photographic apparatus, the combination of a housing; a prime mover mounted in said housing and including a motor and a rotary output member driven by said motor; a first camera assembly for receiving motion from said prime mover; an auxiliary camera assembly comprising a ratchet wheel rotatable in said housing; and an auxiliary drive for said auxiliary camera assembly, comprising a rotary input member movable into and from direct torque-receiving engagement with said output member, a power train connecting said input member with said auxiliary camera assembly, and actuating means for moving said input member into and from direct engagement with said output member at the will of the operator, said input member comprising a cluster of gears each movable into torque-receiving engagement with said output member to thereby operate said power train at one of several speeds, said cluster being movable axially to place a selected gear into register with said output member and said power train comprising a pawl for rotating said ratchet wheel and means coupling said pawl for axial movement with said cluster, the axial length of said ratchet wheel being such that said ratchet wheel can be engaged and rotated by said pawl in each axial position of said cluster.

6. A combination as defined in claim 5, wherein said output member is a worm shaft and said gears are worm gears having different diameters.

7. A combination as defined in claim 6, wherein said actuating means comprises means for moving said cluster axially and for moving the selected worm gear into and from mesh with the worm shaft.

8. A combination as defined in claim 6, wherein said actuating means comprises a shaft rotatably and axially movably mounted in said housing, handgrip means for moving said shaft, and a lever fixed to said shaft, said cluster of gears being mounted on said lever for rotation about an axis which is parallel to the axis of said last mentioned shaft and at least substantially normal to the axis of said worm shaft.

9. In a photographic apparatus, the combination of a housing; a prime mover mounted in said housing and including a motor and a rotary worm shaft driven by said motor; a first camera assembly for receiving motion from said prime mover; an auxiliary camera assembly comprising a ratchet wheel; and an auxiliary drive for said auxiliary camera assembly, comprising a rotary input member movable into and from direct torque-receiving engagement with said worm shaft, a power train connecting said input member with said auxiliary camera assembly, and actuating means for moving said input member into and from direct engagement with said worm shaft at the will of the operator, said input member comprising a cluster of worm gears having different diameters and each movable into torque-receiving engagement with said worm shaft to thereby operate said power train at one of several speeds, said actuating means comprising a second shaft rotatably and axially movably mounted in said housing, handgrip means for moving said second shaft, and a first lever fixed to said second shaft, said cluster of worm gears being mounted on said first lever for rotation about an axis which is parallel to the axis of said second shaft and at least substantially normal to the axis of said worm shaft, said power train comprising a crankshaft driven by that worm gear of said cluster which meshes with said worm shaft, a second lever pivotably secured to said first lever and having a first arm pivoted by said crankshaft and a second arm, a pawl mounted on said second arm and biasing means mounted on said first lever for urging said pawl against said ratchet wheel.

* * * * *